United States Patent
Lin et al.

(10) Patent No.: US 11,055,826 B2
(45) Date of Patent: *Jul. 6, 2021

(54) METHOD AND APPARATUS FOR IMAGE PROCESSING

(71) Applicant: ArcSoft Corporation Limited, Hangzhou (CN)

(72) Inventors: Jianhua Lin, Hangzhou (CN); Li Yu, Hangzhou (CN); Feng Zhou, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,043

(22) Filed: Sep. 9, 2020

(65) Prior Publication Data

US 2020/0410646 A1 Dec. 31, 2020

Related U.S. Application Data

(63) Continuation of application No. 16/123,610, filed on Sep. 6, 2018, now Pat. No. 10,803,556.

(30) Foreign Application Priority Data

Sep. 7, 2017 (CN) .......................... 201710802117.5

(51) Int. Cl.
| | |
|---|---|
| *G06T 5/00* | (2006.01) |
| *G06T 7/593* | (2017.01) |
| *H04N 5/232* | (2006.01) |
| *G06T 5/50* | (2006.01) |
| *H04N 5/225* | (2006.01) |
| *H04N 5/222* | (2006.01) |

(52) U.S. Cl.
CPC ............... *G06T 5/002* (2013.01); *G06T 5/50* (2013.01); *G06T 7/593* (2017.01); *H04N 5/2226* (2013.01); *H04N 5/2258* (2013.01); *H04N 5/23212* (2013.01); *H04N 5/23229* (2013.01); *G06T 2207/10012* (2013.01); *G06T 2207/10024* (2013.01); *G06T 2207/10028* (2013.01)

(58) Field of Classification Search
CPC .......... G06T 5/002; G06T 5/50; G06T 7/593; G06T 2207/10012; G06T 2207/10024; G06T 2207/10028; H04N 5/2226; H04N 5/2258; H04N 5/23212; H04N 5/23229
USPC ......................................................... 348/135
See application file for complete search history.

(56) References Cited

U.S. PATENT DOCUMENTS

| | | | |
|---|---|---|---|
| 2016/0328853 A1* | 11/2016 | Wu ............................ | G06T 7/50 |
| 2017/0142312 A1* | 5/2017 | Dal Mutto ........... | H04N 13/239 |
| 2017/0223338 A1* | 8/2017 | Kang ..................... | G01B 11/24 |

* cited by examiner

*Primary Examiner* — Allen C Wong
(74) *Attorney, Agent, or Firm* — Osha Bergman Watanabe & Burton LLP

(57) ABSTRACT

An apparatus for image processing includes a processor and a depth camera. The processor obtains a first two-dimensional image and focusing information of the first two-dimensional image, and obtains depth information of a part or all of a content captured in the first two-dimensional image via the depth camera. The processor determines a background area of the first two-dimensional image according to the focusing information. The processor also performs bokeh on the background area of the first two-dimensional image according to the depth information.

15 Claims, 6 Drawing Sheets

METHOD AND APPARATUS FOR IMAGE PROCESSING

CROSS-REFERENCE TO RELATED APPLICATIONS

This application is a continuation of U.S. patent application Ser. No. 16/123,610, filed on Sep. 6, 2018, which claims priority to Chinese Patent Application No. 201710802117.5, filed on Sep. 7, 2017. The entire contents of these applications are hereby incorporated by reference.

TECHNICAL FIELD

The present invention relates to a method and an apparatus for image processing, and in particular, to a method and an apparatus for performing bokeh (blurring) on the background of an image.

BACKGROUND

In a daily life, a situation usually happens that background is disordered or not wanted when shooting a video or a static image. The subject may be highlighted and more vivid to generate better effect of the image by blurring background of the image, that is bokeh of the background.

In the prior art a digital camera may perform bokeh on the background by a hardware with large aperture or large zooming. The digital camera usually performs bokeh on the background by four ways as follows: 1. Make times of zooming, which are focal length, as large as possible; 2. The distance between the subject and the background is as large as possible in shot scene. 3. The distance between the shot scene and lens is as large as possible. 4. The aperture is as large as possible when shooting requirements are fulfilled.

In the prior art, when performing bokeh on the background the requirements for hardware are high, operation is difficult, and it is not possible to perform bokeh quickly.

SUMMARY

The present invention provides a method and an apparatus for image processing, which can solve the problem in the prior art that is when performing bokeh on the background the requirements for hardware are high, operation is difficult, and it is not possible to perform bokeh quickly.

A first aspect of the present invention provides a method for image processing, comprising: obtaining a first two-dimensional image and focusing information of the first two-dimensional image, and obtaining depth information of a part or all of content captured in the first two-dimensional image, determining a background area of the first two-dimensional image according to the focusing information, performing bokeh on the background area of the first two-dimensional image according to the depth information.

A second aspect of the present invention provides an apparatus for image processing, wherein the apparatus comprises: an obtaining module, configured to obtain a first two-dimensional image and focusing information of the first two-dimensional image, and obtaining depth information of a part or all of content in the first two-dimensional image; a determining module, configured to determine a background area of the first two-dimensional image according to the focusing information; a background bokeh module, configured to perform bokeh on the background area of the first two-dimensional image according to the depth information.

A third aspect of the present invention provides a computer-readable medium storing computer instructions that, when executed by a first processor, cause the first processor to perform steps of the first aspect of the present invention, or any of the first to twelfth implementing way of the second aspect of the present invention.

A fourth aspect of the present invention provides an apparatus for image processing, comprising a storage, a second processor and computer instructions stored in the storage and executed by the second processor, wherein the computer instructions are executed by the second processor to perform steps of the first aspect of the present invention, or any of the first to twelfth implementing way of the second aspect of the present invention.

The method and apparatus for image processing provided by the present invention can reduce requirements for hardware, operate easily, and perform bokeh on the background quickly when performing bokeh on the background.

DESCRIPTION OF EMBODIMENTS

The following specifically describes the technical solution in the embodiments of the present invention with reference to the accompanying draws in the embodiments of the present invention.

The terms "a first", "a second", etc. in the claims, embodiments and figures is used to distinguish different objects and not to limit particular order The term "and/or" is used to describe relationship of related objects, which includes three relationships. For example, A and/or B can describe: A only, A and B, and B only.

In the embodiments of the present invention, the word "exemplary" or "for example" is used to make an example, evidence or explanation. The embodiments or solution described as "exemplary" or "for example" in the embodiments should not be interpreted as better or having more advantage than other embodiments or solution. Precisely, the word "exemplary" or "for example" is used to give a conception in detailed way.

What to be explained is, for conciseness and clarity of the diagram, that the elements in the figures are not necessary to be drawn according to a proportion. For example, for clarity, a size of some elements can be enlarged compared to other elements. Besides, some reference of figures can be repeated among figures in an appropriate place to illustrate corresponding or similar elements.

Figure 1:
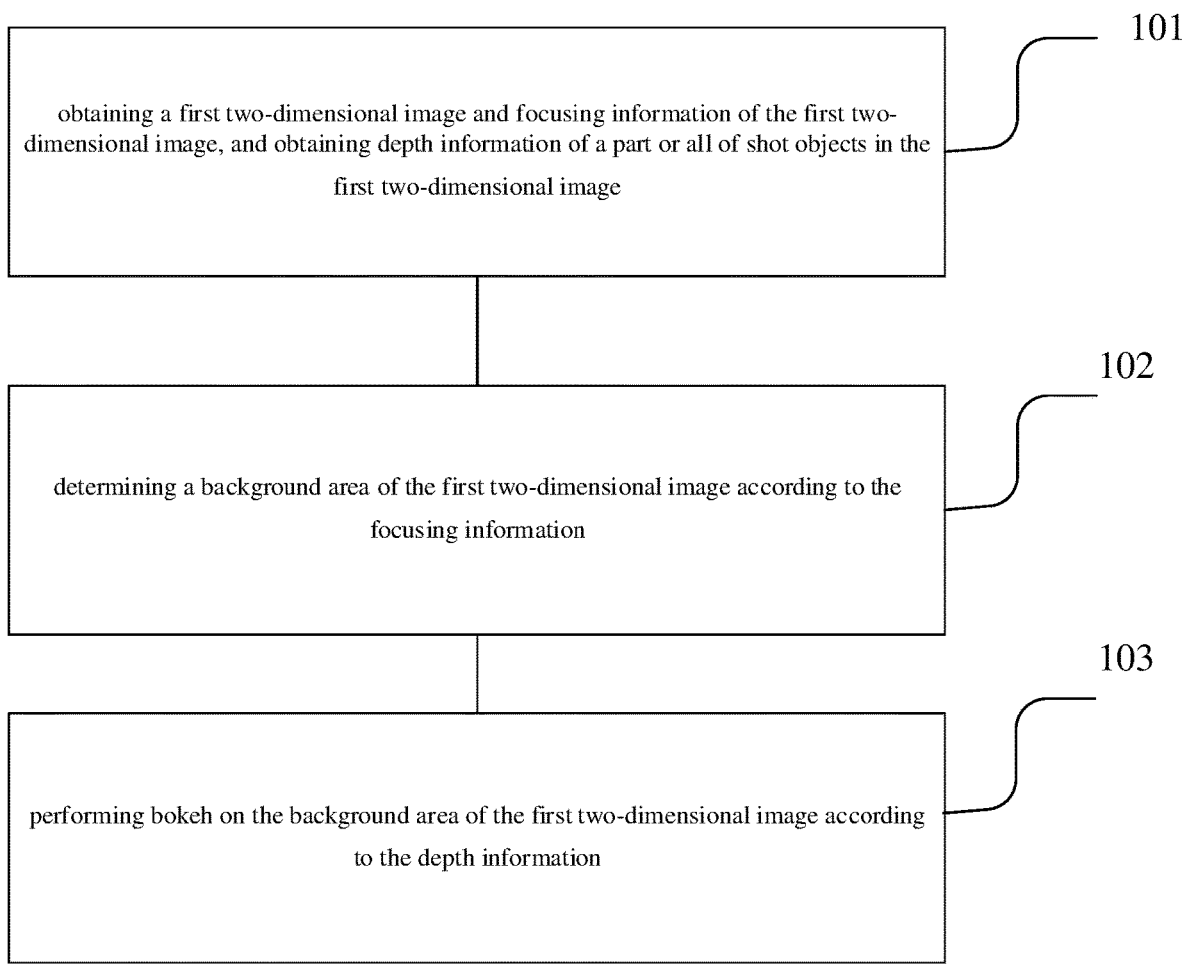
FIG. 1 is a flowchart of a method for image processing provided by the first embodiment of the present invention.

The following, referring to FIG. 1, is to illustrate a method for image processing provided by the first embodiment of the present invention. As shown in FIG. 1, the method includes:

Step 101, obtaining a first two-dimensional image and focusing information of the first two-dimensional image, and obtaining depth information of a part or all of content captured in the first two-dimensional image.

Optionally, the depth information of a part or all of the content in the first two-dimensional image may include a depth map of the part or all of the content in the first two-dimensional image, or a depth value of the content corresponding to at least one pixel in the first two-dimensional image. The depth map may be understood as a set of pixels whose gray value represents distance between the part or all of the content and the picture taking device, or a set of distances between the part or all of the content and the picture taking device. The distance between the part or all of the content and the picture taking device may be noted as depth value of the part or all of the content. If the depth information includes a depth map of all of the content in the first two-dimensional image, the pixel whose gray value represents depth value included in the depth map and the pixel in the first two-dimensional image have one-to-one corresponding relationship.

Optionally, the focusing information of the first two-dimensional image comprises position information of a focusing point or a focusing area of the first two-dimensional image. The position information of the focusing point or the focusing area comprises coordinate information of the focusing point or the focusing area. The coordinate information of the focusing point is coordinate in the whole image in the coordinate system of picture taking device.

Optionally, the method further comprises obtaining a second two-dimensional image of the scene in the first two-dimensional image. The obtaining depth information of the part or all of the content in the first two-dimensional image comprises: obtaining depth information of the part or all of the content in the first two-dimensional image according to the first two-dimensional image and the second two-dimensional image. Optionally, the obtaining depth information of the part or all of the content in the first two-dimensional image according to the first two-dimensional image and the second two-dimensional image comprises: obtaining depth information of the part or all of the content by a stereo matching algorithm according to the first two-dimensional image and the second two-dimensional image. For example, the picture taking device which shoots the first two-dimensional image may be a main camera of dual cameras, and the picture taking device which shoots the second two-dimensional image may be a sub camera of dual cameras. Depth information of the part or all of the content may be obtained by a stereo matching algorithm.

Optionally, the obtaining depth information of the part or all of the content in the first two-dimensional image comprises: obtaining depth information of the part or all of the content in the first two-dimensional image by a depth camera. For example, the picture taking device which shoots the first two-dimensional image may be an ordinary camera, and the picture taking device which obtains depth information of the part or all of the content in the first two-dimensional image may be a depth camera. Optionally, the depth camera may be a depth camera in a terminal, and the depth camera may be placed side by side with the non-depth camera which shoots the first two-dimensional image, that is the ordinary camera. The non-depth camera may be an RGB camera.

Optionally, the method further comprises: obtaining mapping relationship between depth information of the part or all of the content and corresponding pixels in the first two-dimensional image. The "corresponding" means the pixel and the depth information are corresponding to the same content. It is noted that, the part or all of the content may be an object that is represented by pixels. Optionally, the depth information comprises depth map; the obtaining the mapping relationship between the depth information of the part or all of the content and the corresponding pixels in the first two-dimensional image comprises: obtaining the mapping relationship between coordinates of pixels in the depth map of the part or all of the content and coordinates of the corresponding pixels in the first two-dimensional image. In an actual product, the mapping relationship may be calculated by a processor according to the obtained first two-dimensional image and the depth information, or a mapping relationship between a depth map and a two-dimensional image may be calculated in advance and stored which may be used by look-up table. For example, a mapping relationship between coordinate of each pixel in the depth map and coordinate of a corresponding pixel in the two-dimensional image, which is stored in a form of a table and used by look-up table.

Optionally, the obtaining the mapping relationship between the coordinates of pixels in the depth map of the part or all of the content and the coordinates of the corresponding pixels in the first two-dimensional image comprises: obtaining mapping relationship between the coordinates of the pixels in the depth map and coordinates of the corresponding pixels of the content in a three-dimensional coordinate system of the depth camera; obtaining mapping relationship between the coordinates of the pixels of the content in the three-dimensional coordinate system of the depth camera and coordinates of the corresponding pixels of the content in the three-dimensional coordinate system of a non-depth camera which shoots the first two-dimensional image; and obtaining mapping relationship between the coordinates of the pixels of the content in the three-dimensional coordinate system of the non-depth camera and the coordinates of the corresponding pixel in the first two-dimensional image of the content. Optionally, the method further comprises: correcting the depth map according to distortion coefficient of the depth camera. Optionally, the method further comprises: correcting mapping relationship between coordinates of the pixels of the content in the three-dimensional coordinate system of the non-depth camera and coordinates of the pixels of the content in the first two-dimensional image according to the distortion coefficient of the non-depth camera.

Specifically, the mapping relationship between coordinates $(u^D, v^D)$ of a pixel in the depth map and coordinates $(X^D, Y^D, Z^D)$ of a corresponding pixel of the content in the three-dimensional coordinate system of the depth camera may be obtained by the following formulas:

$$X^D = (u^D - c_x^D)/f_x^D * Z^D,$$

$$Y^D = (v^D - C_y^D)/f_y^D * Z^D;$$

where $(u^D, v^D)$ are the coordinates of the pixel in the coordinate system of the depth map, $c_x^D$ and $c_y^D$ are coordinates of principal point in the x direction and y direction, respectively, $f_x^D$ and $f_y^D$ are focal lengths in the x direction and y direction, and $Z^D$ is a depth value of the point which may be obtained from the depth map.

Specifically, for example, the ordinary camera is an RGB camera, and the mapping relationship between the coordinates of the pixel of the content in the three-dimensional coordinate system of the depth camera and coordinates of the pixel of the content in the three-dimensional coordinate system of a non-depth camera which shoots the first two-dimensional image may be obtained by the following algorithm:

$$M^{RGB} = [R_{relative} | T_{relative}] M^D;$$

where $M^{RGB}$ is coordinate of the content in the coordinate system of the RGB camera, that is the non-depth camera, $R_{relative}$ is a rotation matrix between the RGB camera and the depth camera, $T_{relative}$ is translation matrix between the above two cameras, and $M^D$ is coordinate of the content in the coordinate system of the depth camera.

Specifically, the mapping relationship between coordinates of a pixel of the content in the three-dimensional coordinate system of the non-depth camera and coordinates of a corresponding pixel of the content in the first two-dimensional image may be obtained by the following algorithm:

$$x^C = X^C / Z^C,$$

$$y^C = Y^C / Z^C;$$

wherein $(x^C, y^C)$ are coordinates of the pixel of the content in the first two-dimensional image, and $(X^C, Y^C, Z^C)$ are coordinates of the pixel of the content in the three-dimensional coordinate system of the non-depth camera.

Optionally, the obtaining the first two-dimensional image and obtaining the depth information of the part or all of content in the first two-dimensional image may include: obtaining the first two-dimensional image and the depth information of the part or all of content in the first two-dimensional image from a storing device, for example, the depth information may be a depth map.

Step 102, determining a background area of the first two-dimensional image according to the focusing information.

Optionally, the determining the background area of the first two-dimensional image according to the focusing information comprises: determining a main area (e.g., foreground area) of the first two-dimensional image and the background area of the main area according to the position information of the focusing point or the focusing area. The position information of the focusing point or the focusing area comprises coordinate information of the focusing point or the focusing area. For example, after obtaining the coordinate information of the focusing point, the main area may be determined by several methods, such as background modeling, edge extraction and so on according to the coordinate information of the focusing point, and background area may be determined after determining the main area. For example, it may be determined that an area except for the main area belongs to the background area, or according to the depth information it is determined that a set of pixels which have similar depth information belongs to the same background area, or the background area may be determined according to the depth information, texture information and so on.

Optionally, the content may include at least one main area and at least one background. For example, the main area in the first two-dimensional image may be a person, and the background may be a tree, a building, the sky, and land. The obtaining the depth information of the part of the content in the first two-dimensional image may include obtaining depth information of a person, and obtaining depth information of a tree and a building.

Step 103, performing bokeh (blurring) on the background area of the first two-dimensional image according to the depth information.

Optionally, the depth information of the part or all of the content in the first two-dimensional image comprises a depth value of the content corresponding to at least one pixel in the first two-dimensional image; the performing bokeh on the background area of the first two-dimensional image according to the depth information comprises: performing different intensity of bokeh on pixels corresponding to different depth values in the background area of the first two-dimensional image. For example, the content in the first two-dimensional image may include: the main area is a person, and the background may include a tree, a car, a building and cloud. The distance between these different background and picture taking device is from near to far. After obtaining the depth information, the distance between them and the picture taking device may be determined according to the depth information, that is depth value, and the farther the background is from the picture taking device, the higher intensity of bokeh of the background is, which means more vague. The main area of the first two-dimensional image may be not performed bokeh on. The method of bokeh may include:

Gauss filter or Box Filter (Box Filter). The depth values of pixels included in the same background, such as the tree, in the first two-dimensional image are not same, so different intensity of bokeh may be determined according to different ranges of the depth values. For example, depth values (20-30] are corresponding to weak intensity of bokeh, and depth values (30-40] are corresponding to strong intensity of bokeh. Also, different background areas may be determined at first, and intensity of bokeh is determined according to an average value or the maximal value or minimum value of the depth values corresponding to pixels of the background areas. Optionally, because the depth value corresponding to one pixel of the first two-dimensional image may be obtained, the minimum target of bokeh is the one pixel. In fact, it may be a set of many pixels, such as a set of pixels which constitutes a part or whole of a tree.

Optionally, in fact, based on need same intensity of bokeh may be performed on pixels which have different depth values. But as long as different intensity of bokeh is performed on pixels corresponding to different depth values in a bokeh method, the method should fall into the protection scope of the present invention.

Optionally, the method further comprises:

obtaining focusing indicating information, wherein the focusing indicating information instructs whether focusing is being performed;

determining that the focusing indicating information instructs focusing is being performed, obtaining a third two-dimensional image and focusing information of the third two-dimensional image after focusing is completed, obtaining depth information of a part or all of the content in the third two-dimensional image, determining a background area of the third two-dimensional image according to the focusing information of the third two-dimensional image, and performing bokeh on the background area of the third two-dimensional image according to the depth information, or, determining that the focusing indicating information instructs the focusing is not being performed, obtaining a fourth two-dimensional image which is the next frame of the first two-dimensional image, obtaining depth information of a part or all of the content in the fourth two-dimensional image, determining a background area of the fourth two-dimensional image according to the focusing information of the fourth two-dimensional image, and performing bokeh on the background area of the fourth two-dimensional image according to the depth information.

Optionally, the focusing information of the third two-dimensional image comprises position information of a focusing point or a focusing area of the third two-dimensional image, such as coordinate information of the focusing point or the focusing area. The determining the background area of the third two-dimensional image according to the focusing information comprises: determining a main area of the third two-dimensional image and the background area of the main area according to the position information of the focusing point or the focusing area. The depth information of the part or all of the content in the third two-dimensional image comprises a depth value of the content corresponding to at least one pixel in the third two-dimensional image. The performing bokeh on the background area of the third two-dimensional image according to the depth information comprises: performing different intensity of bokeh on pixels corresponding to different depth values in the background area of the third two-dimensional image. About the other detailed description about the third two-dimensional image in the above method the aforementioned description about the first two-dimensional image may be referred. Similarly, About the detailed description about the fourth two-dimensional image in the above method the aforementioned description about the first two-dimensional image may be referred. For example, the depth information of the part or all of the content in the fourth two-dimensional image comprises a depth value of the content corresponding to at least one pixel in the fourth two-dimensional image; the performing bokeh on the background area of the fourth two-dimensional image according to the depth information comprises: performing different intensity of bokeh on pixels corresponding to different depth values in the background area of the fourth two-dimensional image. By using the focusing indicating information, the effect of real-time background bokeh in a video with high frame rate can be achieved, and accuracy and stability of background bokeh may be increased.

Figure 2:
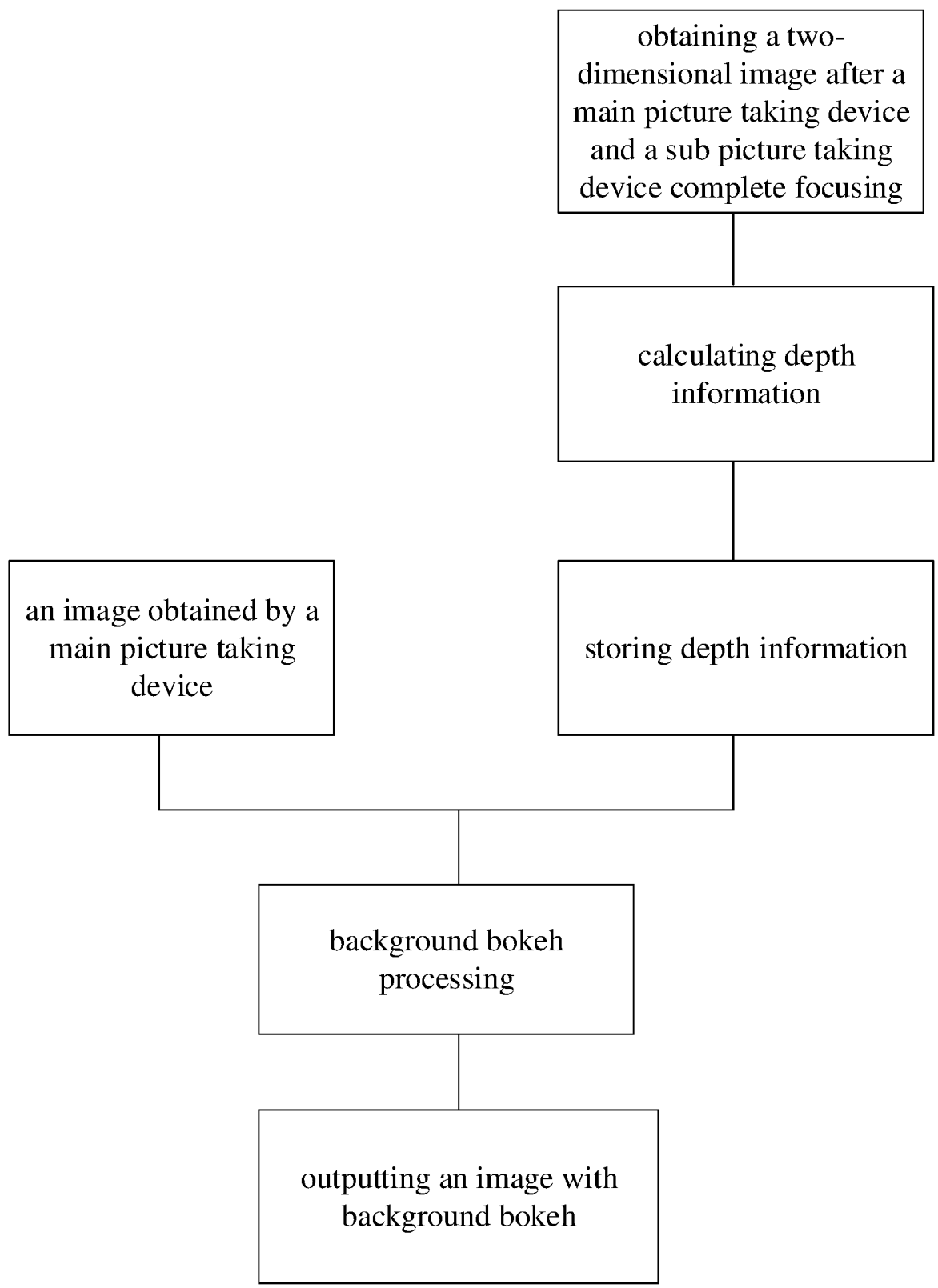
FIG. 2 is a flowchart of another method for image processing provided by the first embodiment of the present invention.

For example, FIG. 2 illustrates a specific process to realize the present invention taking dual cameras as an example. The dual cameras may be used in a terminal, such as cell phone, notebook computer, computer, or tablet and so on. As shown in FIG. 2, after completion of the focusing, the first two-dimensional image obtained by a main picture taking device and a second two-dimensional image obtained by a sub picture taking device may be obtained, and depth information may be computed based on the first two-dimensional image and the second two-dimensional image. The depth information may be computed by a stereo matching algorithm. Optionally, the depth information may be depth map. The computed depth information may be stored in a storage, which may be ROM (Read Only Memory) or RAM (Random Access Memory). Then bokeh may be performed on the background area of the first two-dimensional image according to the first two-dimensional image, the obtained depth information and the focusing information of the first two-dimensional image. Then the image with background bokeh may be output. About the detailed description of the procedure the aforementioned relative description may be referred to.

Figure 3:
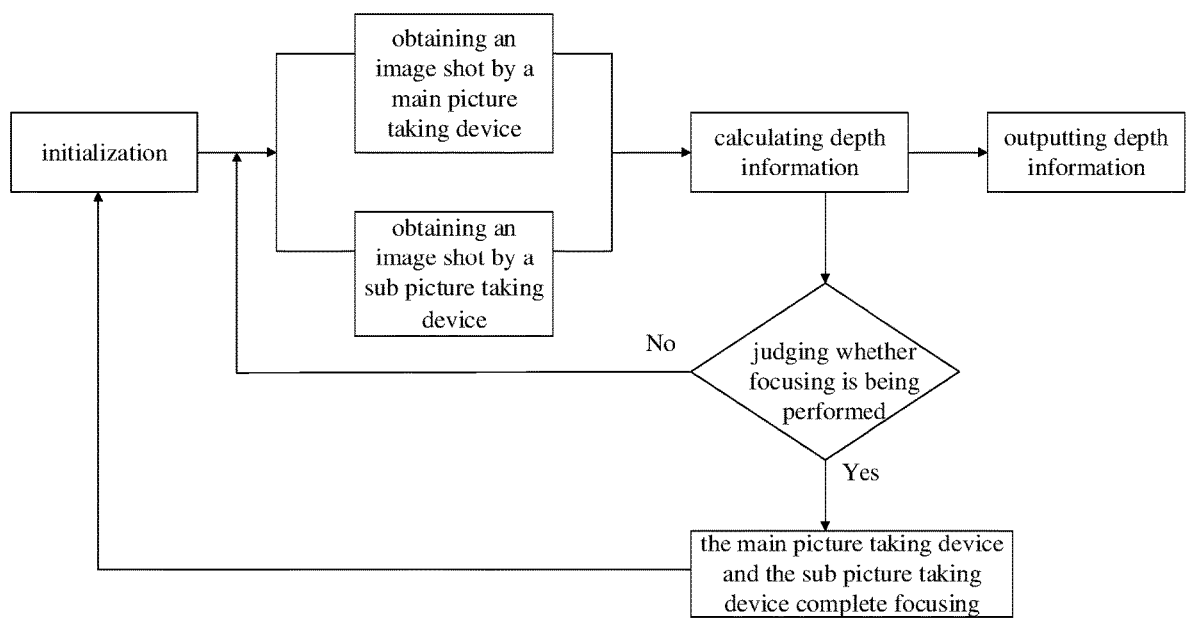
FIG. 3 is a flowchart of another method for image processing provided by the first embodiment of the present invention.

The followings further illustrate the aforementioned procedure to obtain the depth information as shown in FIG. 3.

The obtaining the image shot by the main picture taking device in FIG. 3 may include: obtaining the first two-dimensional image shot by the main picture taking device from the storage. The obtaining the image shot by the sub picture taking device may include: obtaining the second two-dimensional image shot by the sub picture taking device from storage. The calculating depth information may include: calculating depth information by a stereo matching algorithm or another algorithm based on the first two-dimensional image and the second two-dimensional image, such as depth map, and outputting the depth information. The judging whether focusing is being performed may include: obtaining focusing indicating information, wherein the focusing indicating information instructs whether focusing is being performed, judging whether focusing is being performed based on the focusing indicating information. When the focusing indicating information instructs focusing is being performed, waiting for completion of focusing of the main picture taking device and sub picture taking device, and after completion of the focusing, initialization is performed. The initialization may include: at least one of allocating storage space, initializing parameters and other actions about shooting preparation. Then the two-dimensional images are obtained by the main picture taking device and sub picture taking device. When the focusing indicating information instructs focusing is not being performed, a next frame of the first two-dimensional image and a next frame of the second two-dimensional image are obtained, and the depth information is calculated based on the next frame of the first two-dimensional image and the next frame of the second two-dimensional image, such as a depth map. Then the depth information is output.

By the loop shown in FIGS. 2 and 3, real-time videos with background bokeh may be output.

The method disclosed by the first embodiment can reduce requirements for hardware, operate easily, and perform bokeh on the background quickly when performing bokeh on the background. Not only a single image can be processed, but effect of real-time background bokeh with high frame rate can be achieved by using depth information with low frame rate, which can increase accuracy and stability of the background bokeh.

Figure 4:
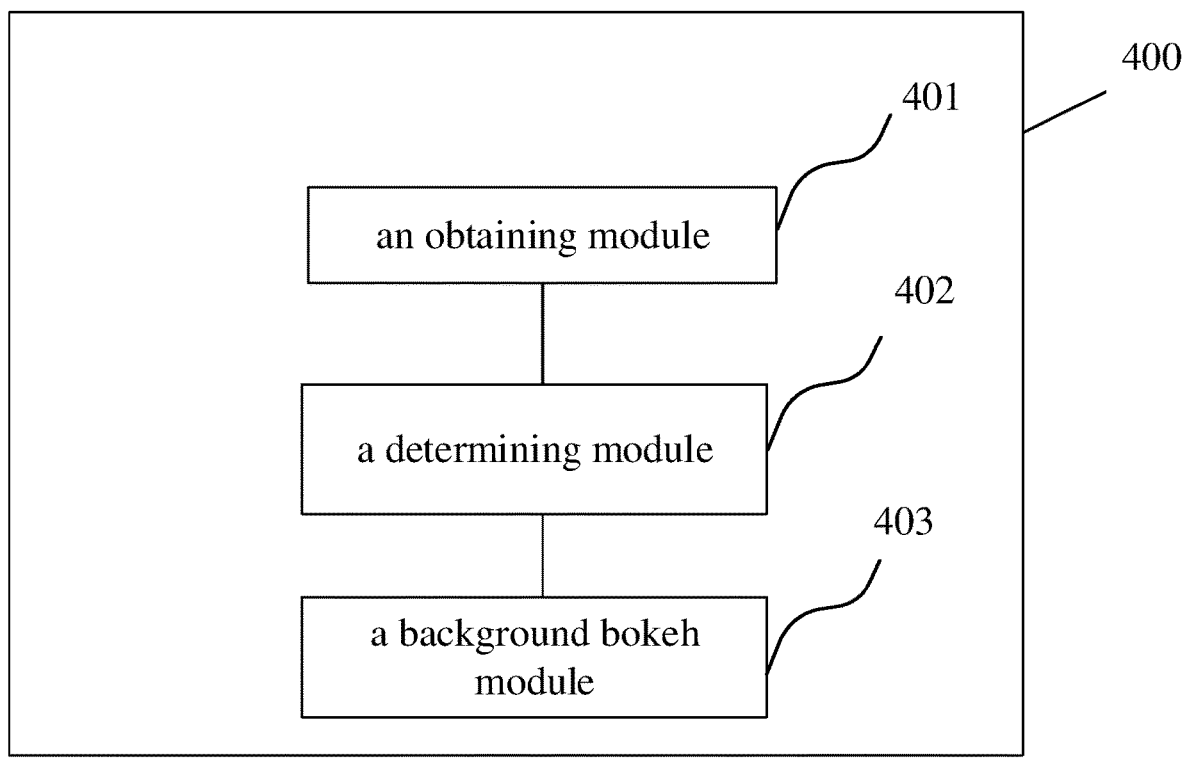
FIG. 4 is a structural diagram of an apparatus for image processing provided by the second embodiment of the present invention.

The followings illustrate an apparatus 400 for image processing provided by the second embodiment of the present invention as shown in FIG. 4, wherein the apparatus comprises:

an obtaining module 401, configured to obtain a first two-dimensional image and focusing information of the first two-dimensional image, and obtaining depth information of a part or all of the content in the first two-dimensional image;

Optionally, the depth information of a part or all of the content in the first two-dimensional image may include depth map of the part or all of the content in the first two-dimensional image, or a depth value of the content corresponding to at least one pixel in the first two-dimensional image. The depth map may be understood as a set of pixels whose gray value expresses distance between the part or all of the content and the picture taking device, or a set of distance between the part or all of the content and the picture taking device. The distance between the part or all of the content and the picture taking device may be noted as depth value of the part or all of the content. If the depth information includes depth map of all of the content in the first two-dimensional image, the pixel whose gray value expresses depth value included in the depth map and the pixel in the first two-dimensional image have one-to-one corresponding relationship.

Optionally, the focusing information of the first two-dimensional image comprises position information of a focusing point or a focusing area of the first two-dimensional image. The position information of the focusing point or the focusing area comprises coordinate information of the focusing point or the focusing area. The coordinate information of the focusing point is coordinate in the whole image in the coordinate system of picture taking device.

Optionally, the obtaining module 401, further configured to obtain a second two-dimensional image of the content in the first two-dimensional image. The obtaining module 401, specifically configured to obtain depth information of the part or all of the content in the first two-dimensional image according to the first two-dimensional image and the second two-dimensional image. The obtaining module 401, specifically configured to obtain depth information of the part or all of the content by a stereo matching algorithm according to the first two-dimensional image and the second two-dimensional image. For example, the picture taking device which shoots the first two-dimensional image may be a main camera of dual cameras, and the picture taking device which shoots the second two-dimensional image may be a sub camera of dual cameras. Depth information of the part or all of the content may be obtained by a stereo matching algorithm. Optionally, the obtaining module 401 further configured to obtain depth information of the part or all of the content in the first two-dimensional image by a depth camera. For example, the picture taking device which shoots the first two-dimensional image may be an ordinary camera, and the picture taking device which obtains depth information of the part or all of the content in the first two-dimensional image may be a depth camera. Optionally, the depth camera may be a depth camera in a terminal, and the depth camera may be placed side by side with the non-depth camera which shoots the first two-dimensional image, that is the ordinary camera. The non-depth camera may be an RGB camera.

Optionally, the obtaining module is further configured to obtain mapping relationship between depth information of the part or all of the content and corresponding pixels in the first two-dimensional image. The "corresponding" means the pixels and the depth information are corresponding to the same content. It is noted that, the part or all of the content may be an object that is represented by pixels. Optionally, the depth information comprises a depth map. The obtaining module is further configured to obtain the obtaining module is specifically configured to obtain the mapping relationship between coordinates of the pixels in the depth map of the part or all of the content and coordinates of the corresponding pixels in the first two-dimensional image. In an actual product, the mapping relationship may be calculated by a processor according to the obtained first two-dimensional image and the depth information, or a mapping relationship between a depth map and a two-dimensional image may be calculated in advance and stored which may be used by look-up table. For example, a mapping relationship between coordinates of each pixel in the depth map and coordinates of a corresponding pixel in the two-dimensional image, which is stored in a form of a table and used by look-up table.

Optionally, the obtaining module, specifically configured to: obtain mapping relationship between the coordinates of the pixels in the depth map and coordinates of the corresponding pixels of the content in a three-dimensional coordinate system of the depth camera; obtain mapping relationship between the coordinates of the pixels of the content in the three-dimensional coordinate system of the depth camera and coordinates of the corresponding pixels of the content in the three-dimensional coordinate system of a non-depth camera which captured the first two-dimensional image; and obtain mapping relationship between the coordinates of the pixels of the content in the three-dimensional coordinate system of the non-depth camera and the coordinates of the corresponding pixels in the first two-dimensional image of the content.

Specifically, the mapping relationship between coordinates $(u^D, v^D)$ of a pixel in the depth map and coordinates $(X^D, Y^D, Z^D)$ of a corresponding pixel of the content in the three-dimensional coordinate system of the depth camera may be determined by the following formulas:

$$X^D=(u^D-c_x^D)/f_x^D*Z^D,$$

$$Y^D=(v^D-c_y^D)/f_y^D*Z^D;$$

where $(u^D, v^D)$ is the coordinates of the pixel in the coordinate system of the depth map, $c_x^D$ and $c_y^D$ are coordinates of principal point in the x direction and y direction, respectively, $f_x^D$ and $f_y^D$ are focal lengths in the x direction and y direction, and $Z^D$ is a depth value of the point which may be obtained from the depth map.

Specifically, for example, the ordinary camera is an RGB camera, and the mapping relationship between the coordinates of the pixel of the content in the three-dimensional coordinate system of the depth camera and coordinates of a corresponding pixel of the content in the three-dimensional coordinate system of a non-depth camera which shoots the first two-dimensional image may be obtained by the following algorithm:

$$M^{RGB}=[R_{relative}|T_{relative}]M^D;$$

where $M^{RGB}$ is coordinate of the content in the coordinate system of the RGB camera, that is the non-depth camera, $R_{relative}$ is a rotation matrix between the RGB camera and the depth camera, T relative is translation matrix between the above two cameras, and $M^D$ is coordinate of the content in the coordinate system of the depth camera.

Specifically, the mapping relationship between coordinates of the pixel of the content in the three-dimensional coordinate system of the non-depth camera and coordinates of a corresponding pixel of the content in the first two-dimensional image may be obtained by the following algorithm:

$$x^C=X^C/Z^C,$$

$$y^C=Y^C/Z^C;$$

wherein $(x^C, y^C)$ are coordinates of the pixel corresponding to the content in the first two-dimensional image, and $(X^C, Y^C, Z^C)$ are coordinates of the content in the three-dimensional coordinate system of the non-depth camera.

Optionally, the obtaining module 401 is specifically configured to obtain the first two-dimensional image and the depth information of the part or all of the content in the first two-dimensional image from a storing device, for example, the depth information may be a depth map.

A determining module 402, configured to determine a background area of the first two-dimensional image according to the focusing information.

Optionally, the focusing information of the first two-dimensional image comprises position information of a focusing point or a focusing area of the first two-dimensional image; and the determining module 402, specifically configured to determine a main area of the first two-dimensional image and the background area of the area of the main area according to the position information of the focusing point or the focusing area. The position information of the focusing point or the focusing area comprises coordinate information of the focusing point or the focusing area. For example, after obtaining the coordinate information of the focusing point, the area of the main area may be determined by several methods, such as background modeling, edge extraction and so on according to the coordinate information of the focusing point, and background area may be determined after determining the area of the main area. For example, it may be determined that an area except for the area of the main area belongs to the background area, or according to the depth information it is determined that a set of pixels which have similar depth information belongs to the same background area, or the background area may be determined according to the depth information, texture information and so on.

Optionally, the content may include at least one main area and at least one background. For example, the main area in the first two-dimensional image may be a person, and the background may be a tree, a building, the sky, and land. The obtaining the depth information of the part of the content in the first two-dimensional image may include obtaining depth information of a person, and obtaining depth information of a tree and a building.

A background bokeh module 403, configured to perform bokeh on the background area of the first two-dimensional image according to the depth information.

Optionally, the depth information of the part or all of the content in the first two-dimensional image comprises a depth value of the content corresponding to at least one pixel in the first two-dimensional image; and the background bokeh module 403, specifically configured to perform different intensity of bokeh on pixels corresponding to different depth values in the background area of the first two-dimensional image. For example, the content in the first two-dimensional image may include: the main area is a person, and the background may include a tree, a car, a building and cloud. The distance between these different background and picture taking device is from near to far. After obtaining the depth information, the distance between them and the picture taking device may be determined according to the depth information, that is depth value, and the farther the background is from the picture taking device, the higher intensity of bokeh of the background is, which means more vague. The main area of the first two-dimensional image may be not performed bokeh on. The method of bokeh may include: Gauss filter or Box Filter (Box Filter). The depth values of pixels included in the same background, such as the tree, in the first two-dimensional image are not same, so different intensity of bokeh may be determined according to different ranges of the depth values. For example, depth values (20-30] are corresponding to weak intensity of bokeh, and depth values (30-40] are corresponding to strong intensity of bokeh. Also, different background areas may be determined at first, and intensity of bokeh is determined according to an average value or the maximal value or minimum value of the depth values corresponding to pixels of the background areas. Optionally, because the depth value corresponding to one pixel of the first two-dimensional image may be obtained, the minimum target of bokeh is the one pixel. In fact, it may be a set of many pixels, such as a set of pixels which constitutes a part or whole of a tree.

Optionally, in fact, based on need same intensity of bokeh may be performed on pixels which have different depth values. But as long as different intensity of bokeh is performed on pixels corresponding to different depth values in a bokeh method, the method should fall into the protection scope of the present invention.

Optionally, the obtaining module, further configured to obtain focusing indicating information, wherein the focusing indicating information instructs whether focusing is being performed; the determining module, further configured to determine that the focusing indicating information instructs focusing is being performed, the obtaining module, further configured to a third two-dimensional image and focusing information of the third two-dimensional image after focusing is completed and obtain depth information of a part or all of the content in the third two-dimensional image, the determining module, further configured to determine a background area of the third two-dimensional image according to the focusing information of the third two-dimensional image, the background bokeh module, further configured to perform bokeh on the background area of the third two-dimensional image according to the depth information; or, the determining module, further configured to determine the focusing indicating information instructs the focusing is not being performed, the obtaining module, further configured to obtain a fourth two-dimensional image which is the next frame of the first two-dimensional image and obtain depth information of a part or all of the content in the fourth two-dimensional image, the determining module, further configured to determine a background area of the fourth two-dimensional image according to the focusing information of the fourth two-dimensional image, the background bokeh module, further configured to perform bokeh on the background area of the fourth two-dimensional image according to the depth information.

Optionally, the focusing information of the third two-dimensional image comprises position information of a focusing point or a focusing area of the third two-dimensional image, such as coordinate information of the focusing point or the focusing area. The determining module 402, further configured to determine a main area of the first two-dimensional image and the background area of the main area according to the position information of the focusing point or the focusing area. The depth information of the part or all of the content in the third two-dimensional image comprises a depth value of the content corresponding to at least one pixel in the third two-dimensional image; and the background bokeh module 403 is specifically configured to perform different intensity of bokeh on pixels corresponding to different depth values in the background area of the first two-dimensional image. About the other detailed description about the third two-dimensional image in the above method the aforementioned description about the first two-dimensional image may be referred. Similarly, About the detailed description about the fourth two-dimensional image in the above method the aforementioned description about the first two-dimensional image may be referred. For example, the depth information of the part or all of the content in the fourth two-dimensional image comprises a depth value of the content corresponding to at least one pixel in the fourth two-dimensional image. The background bokeh module 403 is specifically configured to perform different intensity of bokeh on pixels corresponding to different depth values in the background area of the fourth two-dimensional image. By using the focusing indicating information, the effect of real-time background bokeh in a video with high frame rate can be achieved, and accuracy and stability of background bokeh may be increased.

For example, FIG. 2 illustrates a specific process to realize the present invention taking dual cameras as an example. The dual cameras may be used in a terminal, such as cell phone, notebook computer, computer, or tablet and so on. As shown in FIG. 2, the obtaining module 401 may be configured to obtain the first two-dimensional image obtained by a main picture taking device and a second two-dimensional image obtained by a sub picture taking device may be obtained, and depth information may be computed based on the first two-dimensional image and the second two-dimensional image. The depth information may be computed by a stereo matching algorithm. Optionally, the depth information may be depth map. The apparatus 400 may include storage, and the storage is used to store the computed depth information, which may be ROM (Read Only Memory) or RAM (Random Access Memory). Then the background bokeh module is configured to perform bokeh on the background area of the first two-dimensional image according to the first two-dimensional image, the obtained depth information and the focusing information of the first two-dimensional image. Then the image with background bokeh may be output. About the detailed description of the procedure the aforementioned relative description may be referred to.

The followings further illustrate the procedure that the obtaining module 401 obtains the depth information as shown in FIG. 3. The obtaining module 401 may include a two-dimensional image obtaining submodule, a depth information calculating submodule, and a focusing judging submodule.

The two-dimensional image obtaining submodule is configured to obtain the first two-dimensional image shot by the main picture taking device from the storage and obtain the second two-dimensional image shot by the sub picture taking device from storage.

The depth information calculating submodule is configured to calculate depth information by a stereo matching algorithm or another algorithm based on the first two-dimensional image and the second two-dimensional image, such as depth map, and output the depth information.

The focusing judging submodule is configured to obtain focusing indicating information, wherein the focusing indicating information instructs whether focusing is being performed, judging whether focusing is being performed based on the focusing indicating information. When the focusing indicating information instructs focusing is being performed, waiting for completion of focusing of the main picture taking device and sub picture taking device, and after completion of the focusing, initialization is performed. The initialization may include: at least one of allocating storage space, initializing parameters and other actions about shooting preparation. Then the two-dimensional images are obtained by the main picture taking device and sub picture taking device. When the focusing indicating information instructs focusing is not being performed, a next frame of the first two-dimensional image and a next frame of the second two-dimensional image are obtained, and the depth information is calculated based on the next frame of the first two-dimensional image and the next frame of the second two-dimensional image, such as a depth map. Then the depth information is output.

By the loop shown in FIGS. 2 and 3, real-time videos with background bokeh may be output.

The apparatus disclosed by the second embodiment can reduce requirements for hardware, operate easily, and perform bokeh on the background quickly when performing bokeh on the background. Not only a single image can be processed, but effect of real-time background bokeh with high frame rate can be achieved by using depth information with low frame rate, which can increase accuracy and stability of the background bokeh.

Figure 5:
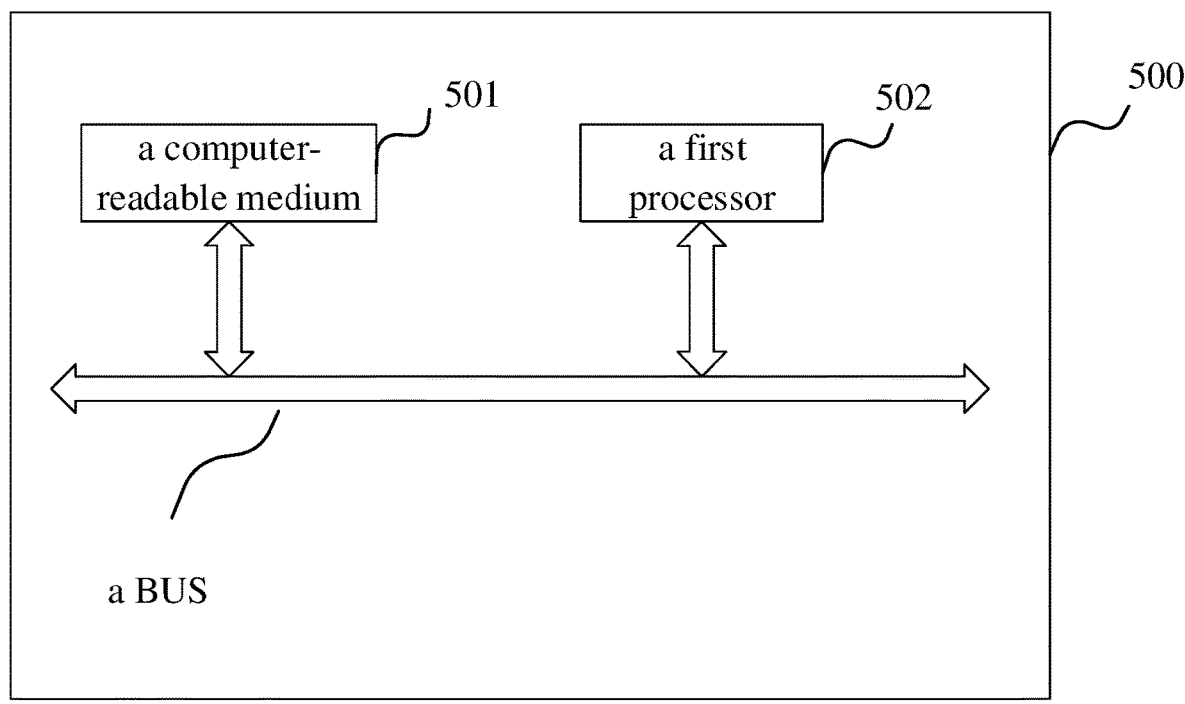
FIG. 5 is a structural diagram of an apparatus for image processing provided by the third embodiment of the present invention.

The followings illustrate an apparatus 500 for image processing provided by the third embodiment of the present invention as shown in FIG. 5. The apparatus includes a computer-readable medium 501 storing computer instructions that, when executed by a first processor 502, cause the first processor 502 to perform steps of the method in the first embodiment.

The apparatus for image processing provided by the present invention can reduce requirements for hardware, operate easily, and perform bokeh on the background quickly when performing bokeh on the background. Not only a single image can be processed, but effect of real-time background bokeh with high frame rate can be achieved by using depth information with low frame rate, which can increase accuracy and stability of the background bokeh.

Figure 6:
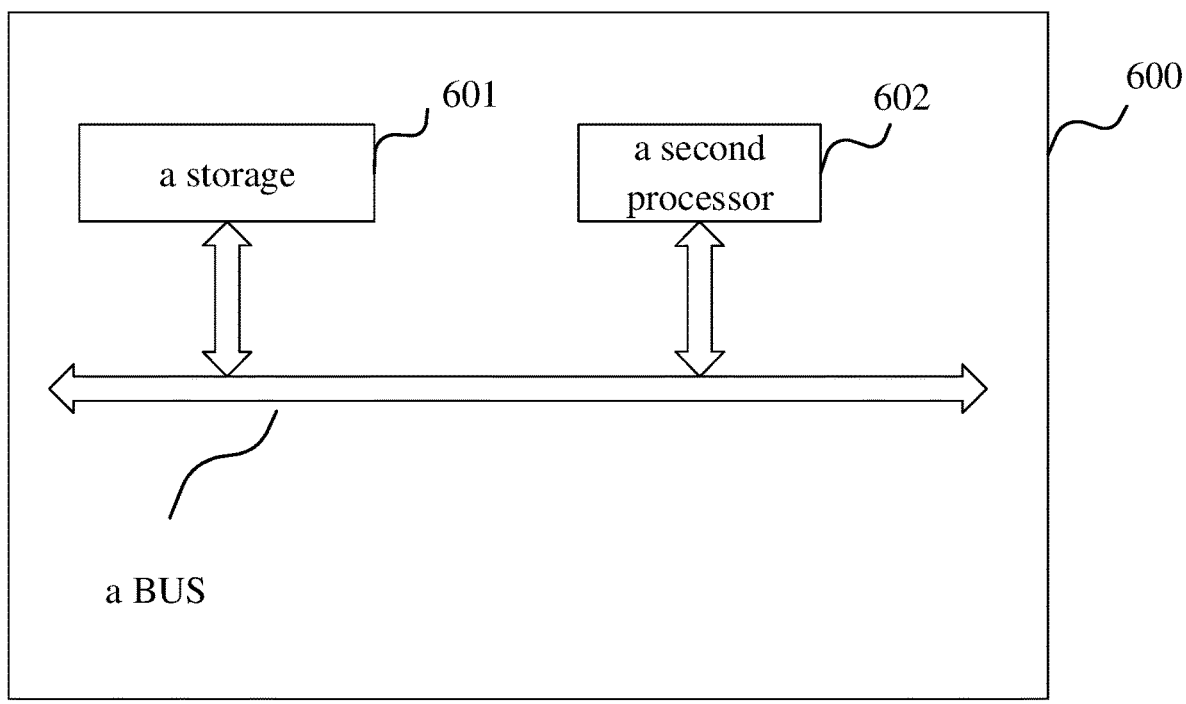
FIG. 6 is a structural diagram of an apparatus for image processing provided by the fourth embodiment of the present invention.

The followings illustrate an apparatus 600 for image processing provided by the fourth embodiment of the present invention as shown in FIG. 6. The apparatus comprises a storage 601, a second processor 602 and computer instructions stored in the storage 601 and executed by the second processor 602, wherein the computer instructions are executed by the second processor 602 to perform steps of the method in the first embodiment. Optionally, as shown in the figure, the apparatus further includes a BUS.

The apparatus for image processing provided by the present invention can reduce requirements for hardware, operate easily, and perform bokeh on the background quickly when performing bokeh on the background. Not only a single image can be processed, but effect of real-time background bokeh with high frame rate can be achieved by using depth information with low frame rate, which can increase accuracy and stability of the background bokeh.

For example, the computer instructions may be separated to form one or more modules/units, the one or more modules/units are stored in the storage, and executed by the processor to complete the present invention. The one or more modules/units may be computer instructions segments that can achieve a particular function, and the computer instructions segments are used to describe a process that the computer instructions are executed in the device/terminal.

The device/terminal may be computing device including cellphone, pad, desk computer, laptop, Personal Digital Assistant, cloud server, etc. The device/terminal may further include, but not limited to, a processor or storage. A person skilled in the art can understand the diagram of the present invention is only an example of the device/terminal, and not a limitation of the device/terminal. The device/terminal can include more or less parts than what is shown in the diagram, or combination of some parts, or different parts. For example, the device/terminal can include input equipment, output equipment, network access equipment, or bus etc.

The processor may be a Central Processing Unit (CPU), another general processor, a Digital Signal Processor (DSP), an Application Specific Integrated Circuit (ASIC), a Field-Programmable Gate Array (FPGA) or another Programmable logical component, a discrete components gate, a transistor logical component, or a discrete hardware component. The general processor may be a micro-processor or another regular processor. The processor is the control center of the device/terminal, connecting each part of the device/terminal by using different interfaces and circuits.

The storage may be used to store the computer instructions and/or a module, the processor realize various function of the device/terminal by executing the computer instructions and/or module stored in the storage and invoking data stored in the storage. The storage may include an instruction sector and a data sector, where the instruction sector may store operating system, an application program for achieving at least one function (for example a picture viewing function) etc. Besides, the storage may include a high speed random access memory, or a nonvolatile memory, such as hard drive, memory, plug in hard drive, Smart Media Card (SMC), Secure Digital (SD) card, Flash Card, at least one disk, Flash element, or other Volatile solid state storage.

The modules/units integrated in the device/terminal may be stored in a computer-readable medium when modules/units are realized in a form of a software function unit, and sold or used as an independent product. Based on this understanding, when realizing the present invention, a part or all of the procedure in the method of the above embodiment may be completed by computer instructions instructing a relative hardware, where the computer instructions are stored in a computer-readable medium, when executed by a processor, cause the processor to perform steps of any of the above method embodiments. The computer instructions include computer program codes, and the computer program codes may be a form of a source code, an object code, an .exe file, or some middle status. The computer-readable medium may include: an entity or device carrying the computer program codes, a recording medium, a USB stick, a mobile hard disk, a magnetic disc, a compact disc, computer storage, Read-Only Memory (ROM), Random Access Memory (RAM), electrical carrier signal, telecommunication signal, or a software distributing medium.

The image of the target object in any of the above embodiments may be an image of a part of the target object, or that of the whole target object. An image of a part of the target object, or that of the whole target object, or a variation of the image of the part of the target object or the whole target object is subject to the method or apparatus provided by the present invention, where the variation does not need an inventive effort of a person skilled in the art, and falls into a protection scope of the present invention.

What is claimed is:

1. An apparatus for image processing, comprising a processor and a depth camera, wherein the processor:
   obtains a first two-dimensional image and focusing information of the first two-dimensional image, and obtains depth information of a part or all of a content captured in the first two-dimensional image via the depth camera;
   determines a background area of the first two-dimensional image according to the focusing information;
   performs bokeh on the background area of the first two-dimensional image according to the depth information,
   wherein the depth information of the part or all of the content in the first two-dimensional image comprises a depth value of the content corresponding to at least one pixel in the first two-dimensional image, and
   wherein the processor performs different intensity of bokeh on pixels corresponding to different depth values in the background area of the first two-dimensional image.

2. The apparatus according to claim 1, wherein
   the focusing information of the first two-dimensional image comprises position information of a focusing point or a focusing area of the first two-dimensional image; and
   the processor determines a main area of the first two-dimensional image and the background area of the main area according to the position information of the focusing point or the focusing area.

3. The apparatus according to claim 1, wherein
   the position information of the focusing point or the focusing area comprises coordinate information of the focusing point or the focusing area.

4. The apparatus according to claim 1, wherein
   the processor obtains a second two-dimensional image of the content in the first two-dimensional image; and
   the processor obtains the depth information of the part or all of the content in the first two-dimensional image according to the first two-dimensional image and the second two-dimensional image.

5. The apparatus according to claim 4, wherein
   the processor obtains the depth information of the part or all of the content by a stereo matching algorithm according to the first two-dimensional image and the second two-dimensional image.

6. The apparatus according to claim 1, wherein
   the processor obtains a mapping relationship between depth information of the part or all of the content and corresponding pixels in the first two-dimensional image.

7. The apparatus according to claim 6, wherein
   the depth information comprises depth map;
   the processor obtains a mapping relationship between coordinates of pixels in the depth map of the part or all of the content and coordinates of the corresponding pixels in the first two-dimensional image.

8. The apparatus according to claim 7, wherein the processor:
   obtains a mapping relationship between the coordinates of the pixels in the depth map and coordinates of corresponding pixels of the content in a three-dimensional coordinate system of a depth camera;
   obtains a mapping relationship between the coordinates of the pixels of the content in the three-dimensional coordinate system of the depth camera and coordinates of corresponding pixels of the content in the three-dimensional coordinate system of a non-depth camera which captured the first two-dimensional image; and
   obtains a mapping relationship between the coordinates of the pixels of the content in the three-dimensional coordinate system of the non-depth camera and the coordinates of the corresponding pixels in the first two-dimensional image of the content.

9. The apparatus according to claim 8, wherein the processor corrects the mapping relationship between the coordinates of the pixels of the content in the three-dimensional coordinate system of the non-depth camera and the coordinates of the corresponding pixels in the first two-dimensional image according to a distortion coefficient of the non-depth camera.

10. The apparatus according to claim 8, wherein the non-depth camera is an RGB camera.

11. The apparatus according to claim 8, wherein the non-depth camera and the depth camera are placed side by side.

12. The apparatus according to claim 7, wherein the processor corrects the depth map according to a distortion coefficient of the depth camera.

13. The apparatus according to claim 1,
    wherein:
    the processor obtains focusing indicating information, wherein the focusing indicating information indicates whether focusing is being performed;
    the processor determines that the focusing indicating information indicates focusing is being performed;

the processor obtains a third two-dimensional image and focusing information of the third two-dimensional image after focusing is completed and obtain depth information of a part or all of the content in the third two-dimensional image;

the processor determines a background area of the third two-dimensional image according to the focusing information; and the processor performs bokeh on the background area of the third two-dimensional image according to the depth information of the part or all of the content in the third two-dimensional image, or wherein:

the processor determines the focusing indicating information indicates the focusing is not being performed, the processor obtains a fourth two-dimensional image which is the next frame of the first two-dimensional image and obtain depth information of a part or all of the content in the fourth two-dimensional image, the processor determines a background area of the fourth two-dimensional image according to the focusing information of the fourth two-dimensional image, and the processor performs bokeh on the background area of the fourth two-dimensional image according to the depth information.

14. The apparatus according to claim 13, wherein the depth information of the part or all of the content in the third two-dimensional image comprises a depth value of the content corresponding to at least one pixel in the third two-dimensional image; and the processor performs different intensity of bokeh on pixels corresponding to different depth values in the background area of the third two-dimensional image.

15. The apparatus according to claim 13, wherein the depth information of the part or all of the content in the fourth two-dimensional image comprises a depth value of the content corresponding to at least one pixel in the fourth two-dimensional image; and the processor performs different intensity of bokeh on pixels corresponding to different depth values in the background area of the fourth two-dimensional image.

\* \* \* \* \*